R. SWEERS.
DISH AND HOLDER FOR ICE CREAM.
APPLICATION FILED JULY 2, 1913.

1,234,507.

Patented July 24, 1917.

WITNESSES:
D. C. Walter
Gertrude Bracker

INVENTOR:
R. Riley Sweers,

UNITED STATES PATENT OFFICE.

RILEY SWEERS, OF TOLEDO, OHIO.

DISH AND HOLDER FOR ICE-CREAM.

1,234,507. Specification of Letters Patent. Patented July 24, 1917.

Application filed July 2, 1913. Serial No. 776,905.

*To all whom it may concern:*

Be it known that I, RILEY SWEERS, a citizen of the United States, residing at Toledo, in the county of Lucas and State of Ohio, have invented certain new and useful Improvements in Dishes and Holders for Ice-Cream; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

In "ice cream parlors" and other places where ice cream and the like are dispensed and where at times it is necessary to serve many customers in a short time, the difficulty of thoroughly cleansing the ice cream dishes in rush hours as fast as the dishes are used, is manifest. Even under the most favorable circumstances where hot water and soap and other conveniences are available, the absolute cleanliness of the dishes is generally not free from doubt. One of the objects of my invention is to obviate the objection here indicated by furnishing a dish which shall be entirely clean and sterile and which, while being ornamental and attractive in appearance, is so cheap that it may be thrown away or destroyed after being once used and this with little if any greater expense than attends the washing of the ordinary dish.

A further object of my invention is to provide a holder for the dishes above referred to, with which the dish may be instantly and firmly engaged, to give it the necessary stability, and from which the dish may be readily and quickly detached.

To these ends, my invention consists of the devices hereinafter described and shown, and illustrated in the accompanying drawing, in which,—

Figure 1:
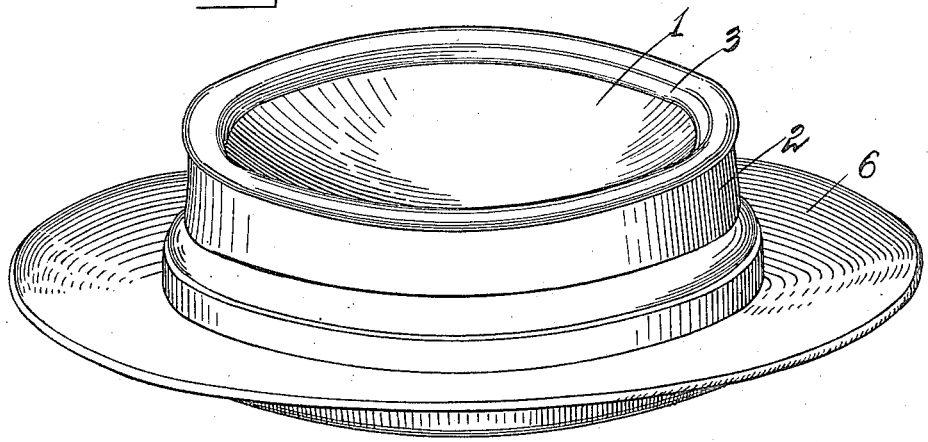
Figure 2:
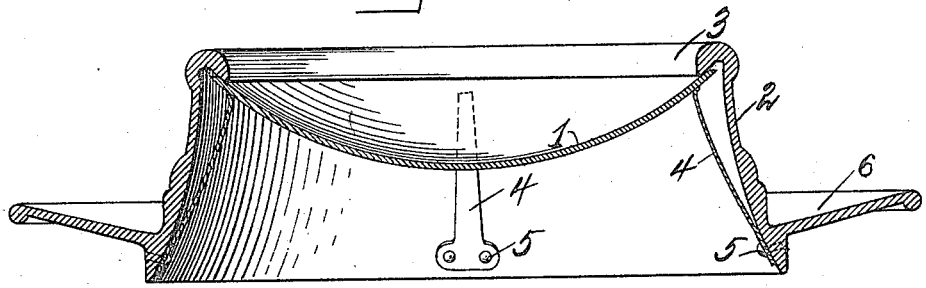

Figure 1, is a perspective view of my dish in its holder and ready for use, and Fig. 2, a central, vertical, transverse, sectional elevation of the same.

Like numerals represent like parts in both views.

In the drawings, 1 is a thin wood dish, of about the thickness of thin veneer, cut or scooped by means of a curved knife in concavo-convex form and having substantially a circular margin. It is not essential however, that the dish-margin be a true circle since the dish is quite flexible and will, within certain limits, quite readily conform to its holder, now to be described.

2 is a holder, preferably of metal, cast, stamped, spun or otherwise formed as may be desired. The holder is circular or ringlike at top and has an inwardly turned lip or flange 3 which is of such dimensions as to barely overlap the top margin of the dish 1. From the lip 3 the holder flares downwardly and outwardly to its bottom which is adapted to rest upon a table. It is necessary to provide means for securely supporting the dish with its margin directly beneath and against the lip 3. To this end, and by way of illustration, the holder is provided with a series of springs 4 the lower ends of which are secured at equidistant intervals around the interior of the holder near its bottom, as at 5, the springs being formed as fingers the upper free ends of which are inclined inwardly, as shown.

The holder being held in one hand, the dish, with its bowl turned downwardly, is pressed upwardly within the cavity of the holder. The margin of the dish presses against the springs forcing them out of the way until the margin of the dish strikes the under side of the lip 3. Now the upper ends of the springs press inwardly toward each other with their ends engaging the under side of the dish near its margin. The dish is now firmly held in place with its margin concealed by the lip 3 and is ready for use. To remove the dish it is only necessary to simultaneously press outwardly upon two or more of the springs 4 when the dish will drop from the holder into the hand. While I have shown an exceedingly simple and effective means for detachably engaging the dish with its holder, I do not of course limit myself to the specific device here described, for many other equivalent devices will suggest themselves to skilled mechanicians.

In the form of my holder illustrated in the drawings, the holder is provided with a ledge or rim 6 of such width as to simulate the rim of a plate and to receive and hold a spoon, wafers, pieces of cake or other accessories.

The wood dish herein referred to is employed in connection with my holder for the reason that, while it is exceedingly cheap and absolutely clean and sterile, it is light, flexible, strong and insoluble, thus overcoming the objections to glass, porcelain and the like, which, for the reasons stated in the outset, are unsuitable for my purpose, and obviating the objections to paper dishes which soon become soft when filled with ice-cream or the like and which do not when wet retain their shape or resist the attacks of spoons.

Having thus described my invention, what I claim and desire to secure by Letters Patent, is—

A device of the described character, comprising a thin flexible concavo-convex wood dish, and a holder for the dish said holder having an inwardly turned lip, and means for detachably supporting the dish in the holder with its margin engaged with said lip.

In testimony whereof I affix my signature in presence of two witnesses.

RILEY SWEERS.

Witnesses:
  EDWARD G. KIRBY,
  GERTRUDE BRACKER.

Copies of this patent may be obtained for five cents each, by addressing the "Commissioner of Patents, Washington, D. C."